United States Patent [19]

Kutnyak

[11] 4,326,561

[45] Apr. 27, 1982

[54] DOUBLE-CHANNEL ELECTRICAL CONDUIT

[75] Inventor: Thomas A. Kutnyak, Greenwood, S.C.

[73] Assignee: Automation Industries, Inc., Greenwich, Conn.

[21] Appl. No.: 156,456

[22] Filed: Jun. 4, 1980

[51] Int. Cl.³ .............................................. F16L 11/16
[52] U.S. Cl. .................................. 138/136; 138/109; 138/122; 138/129; 138/154; 174/109
[58] Field of Search ............... 138/118, 120, 121, 122, 138/129, 131, 134, 135, 136, 154; 174/109

[56] References Cited

U.S. PATENT DOCUMENTS

| 367,301 | 7/1887 | Knight | 138/136 X |
|---|---|---|---|
| 845,051 | 2/1907 | Von Brockdorff | 138/136 X |
| 998,827 | 7/1911 | Armstrong | 138/136 X |
| 2,303,281 | 11/1942 | Johnson | 174/109 |
| 3,459,233 | 8/1969 | Webbe | 138/136 X |

FOREIGN PATENT DOCUMENTS 1117 of 1894 United Kingdom ................ 138/131

Primary Examiner—James E. Bryant, III
Attorney, Agent, or Firm—Francis N. Carten

[57] ABSTRACT

An electrical conduit formed of helical inner and outer channels having movably interlocked flanges, so that the channel convolutions separate on the outside of a bend of the conduit and come together on the inside of the bend.

3 Claims, 5 Drawing Figures

DOUBLE-CHANNEL ELECTRICAL CONDUIT

BACKGROUND OF THE INVENTION

Flexible impermeable electrical wiring conduit is typically made of a single helically configured metal wall strip having forward and trailing edges which interlock in a movable fashion. A cord is commonly wound helically between the interlocked convolutions to space them apart. The construction has a corrugated appearance and a copper ground wire is often applied exteriorly within the outer helical indentation. The assembly is made moisture proof by a continuous outer jacket of extruded plastic.

End fittings are screwed into the end portions of the conduit and attached to an electrical box. In use electrical wires are pulled through the conduit and connected to terminals in the box with the conduit serving as protective armour and a ground for the wires.

Such prior art conduit does not have a smooth bore and snagging and abrasion sometimes occur as the wires are pulled through. The design is relatively heavy and not notably flexible. The strip convolutions cannot themselves be depended upon to provide a ground circuit and therefore the extra strand ground wire is needed, which only adds to the cost, weight and rigidity of the assembly.

The principal purpose of the present invention is to provide a lighter, less expensive more flexible electrical conduit which possesses all the required crush strength and grounding ability.

SUMMARY OF THE INVENTION

In accordance with the invention an electrical conduit comprises an inner channel and an outer channel each having forward and rearward side flanges joined by a connecting base. The inner channel is formed into a helical configuration of spaced convolutions with its flanges extending outwardly, and the outer channel is formed into a similar helical configuration with its flanges extending inwardly. The helical inner and outer channels are movably interlocked with the flanges of the outer channel disposed between the flanges of the inner channel. Spacing means are provided for holding the forward flange of the outer channel a minimum distance from the rearward flange of the inner channel and for holding the forward flange of the inner channel a minimum distance from the rearward flange of the outer channel. An outer circumferentially complete jacket surrounds all of the foregoing elements. When the conduit is bent the channel convolutions separate on the outside of the bend and come together on the inside of the bend.

In a preferred form an elastic spacer strand having a squared off body is disposed between the forward and rearward flanges of the inner channel and together with the base of the inner channel form a smooth conduit bore. The forward and rearward edges of the inner channel being held in fixed relation to the spacer strand so that the spacer strand is compressed on the inside of a conduit bend and stretched on the outside of a conduit bend.

Superior electrical grounding is achieved by this construction since the channel turns make contact along four lines rather than two, namely along the edges of each of the two flanges of each of the two channels. The dual channel design provides versatility in metal selection and combinations of metals may be employed. It is strong design with high crush resistance and yet provides more flexibility than prior art conduits. An extra grounding wire is unnecessary and hence in assembly is lighter and less expensive.

DESCRIPTION OF PREFERRED EMBODIMENT

Each of the forms of electrical conduit described herein are especially suited for fabrication on continuously advancing mandrels as described in U.S. Pat. No. 3,155,559. Such apparatus allows each of the helically disposed elements to be applied in turn together with the longitudinal cords and the outer extruded jacket in a continuous fashion so that the composite conduit emerges from the end of the mandrel in continuous lengths.

Figure 1:
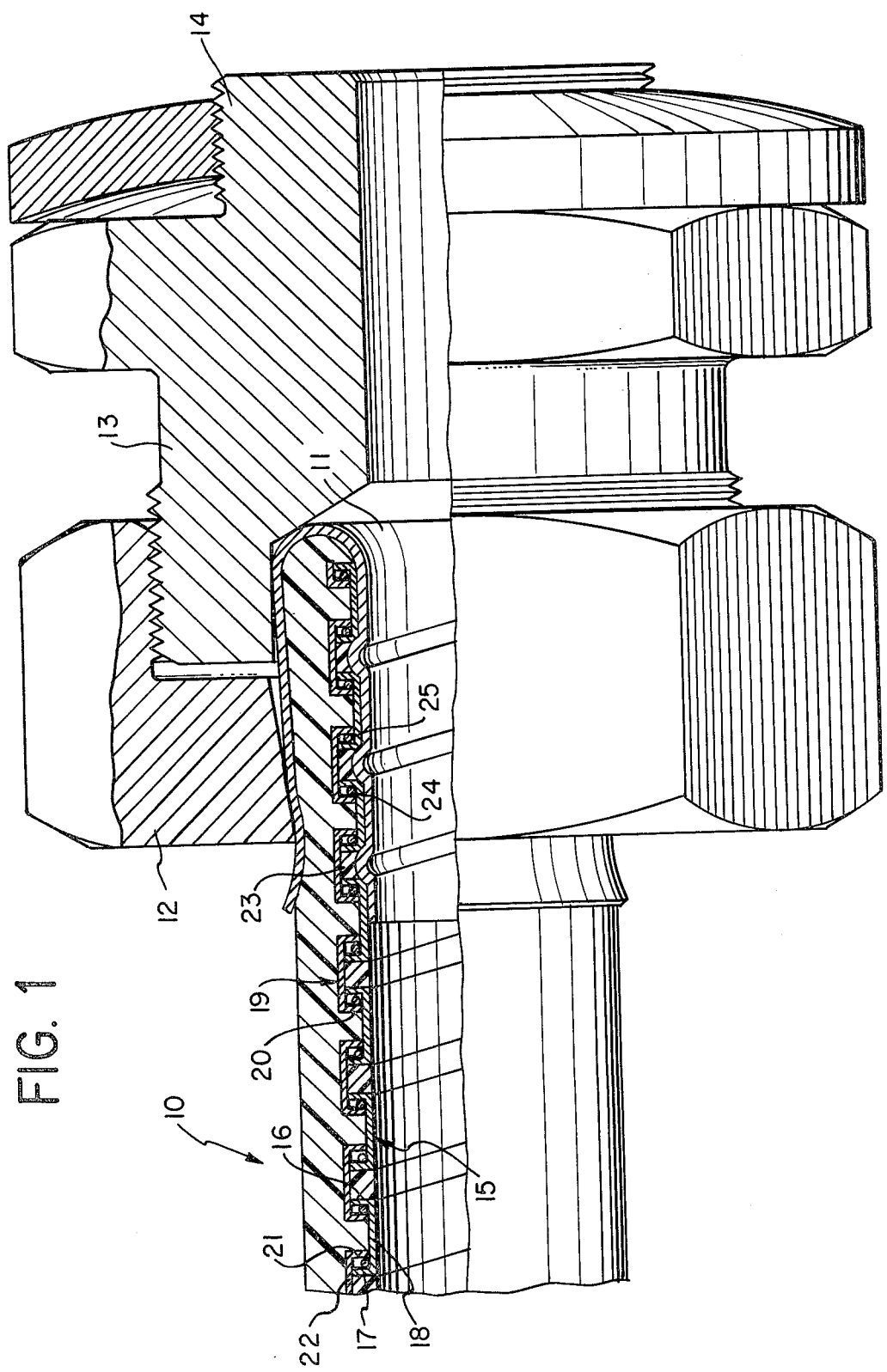
FIG. 1 is a side view, half in section, of one form of the electrical conduit of the invention assembled with an end fitting.
Figure 2:
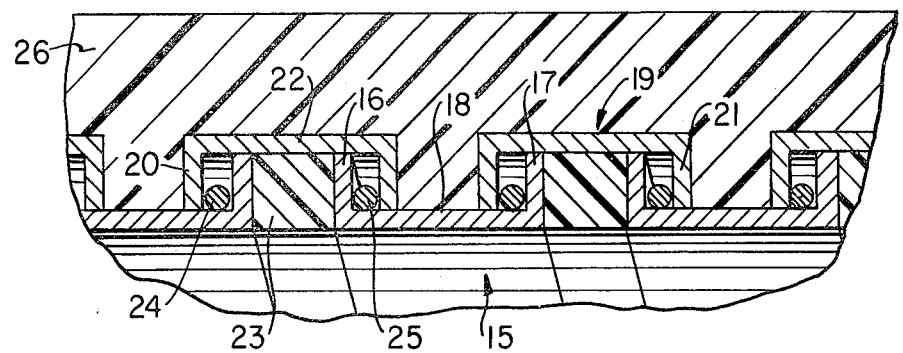
FIG. 2 is an enlarged fragmentary side view partly in section showing the wall construction of the conduit of FIG. 1.
Figure 3:
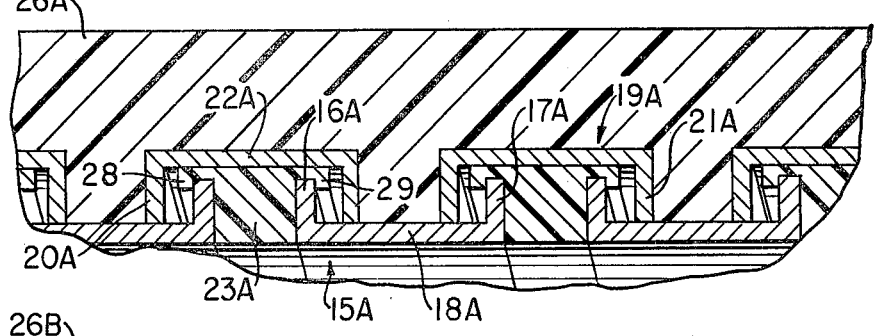
FIG. 3 is an enlarged fragmentary side view partly in section of another embodiment of the conduit of the invention.

Referring first to FIG. 1 a conduit 10 made in accordance with the invention is attached at its end portion to a cylindrical metal insert 11, the form and function of which are described hereafter. A more detailed view of the particular construction of the conduit 10 is shown in FIG. 2 and an alternate embodiment is illustrated in FIG. 3, all described more completely below. The insert 11 is held between a compression nut 12 and a reducing adaptor 13 which are threaded together. On a threaded end 14 of the adaptor 13 a locking nut is screwed in place to hold the entire end fitting to the wall of an electrical inlet or outlet box (not shown).

Figure 5:
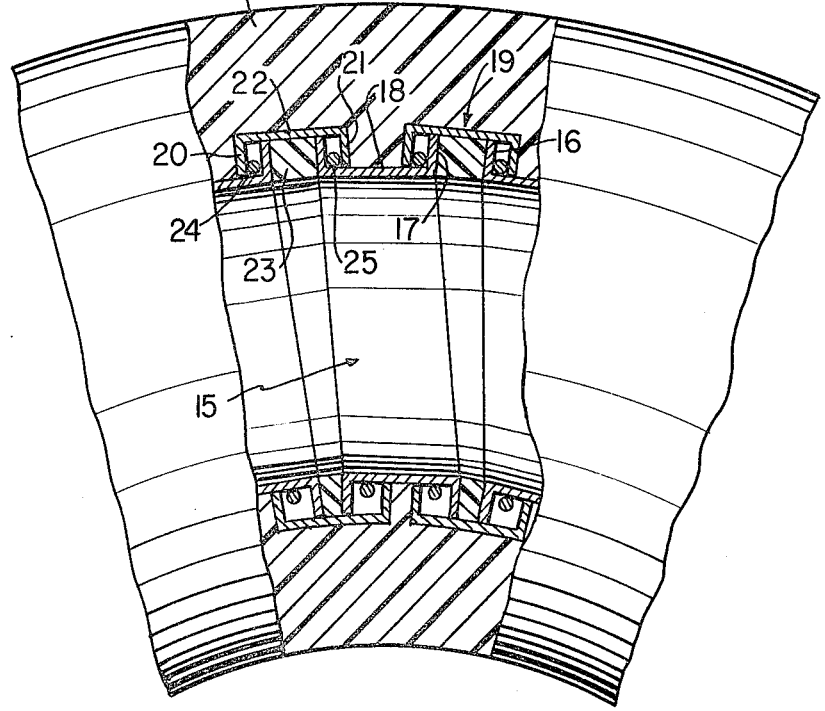
FIG. 5 is an enlarged fragmentary side view partly in section of the conduit of FIGS. 1 and 2 in bent position showing the effects of bending on the wall construction.

FIGS. 2 and 5 are enlarged views of the conduit 10 illustrated in FIG. 1. The conduit comprises an inner channel 15 of metal such as aluminum, copper, zinc or galvanized steel. Bi-metallic or cladded metals such as copper coated steel, copper coated aluminum or aluminum coated steel may also be used to improve the electrical properties of the conduit. The inner channel 15 includes a forward flange 16, a rearward flange 17 and a connecting base 18, varying in thickness from 0.010 to 0.035 inch depending upon the diameter of the conduit. The inner channel 15 is pre-formed into a helical configuration of spaced convolutions with its forward and rearward flanges 16 and 17 spaced apart less than the width of the channel and extending outwardly.

The conduit also includes an outer channel 19 having a forward flange 20 and a rearward flange 21 connected by a base 22. In this embodiment the cross sectional shape and dimension of the inner and outer channels 15 and 19 are identical. The outer channel may be of the same metal as the inner channel or one of the alternate metals mentioned above. It is also pre-formed into a helical configuration of spaced convolutions with its forward and rearward flanges 20 and 21 extending inwardly.

As seen most clearly in FIG. 2 the inner and outer channels are movably interlocked with the flanges 20 and 21 of the outer channel 19 disposed symmetrically between the flanges 16 and 17 of the inner channel 15. Since the channels are of the same cross section, the flanges 16 and 17 of the inner channel 15 make a double line contact with the base 22 of the outer channel 19, and the flanges 20 and 21 of the outer channel 19 making a similar double line contact with the base 18 of the inner channel 15.

Located between the rearward flange 17 and forward flange 16 of the inner channel 18 is a spacer strand 23 of thermoplastic or elastomeric material. This may be a soft, flexible, resilient thermoplastic such as 30–40 durometer polyvinyl chloride, ethylvinyl acetate or polyurethane. In this embodiment the strand 23 is of rectangular cross section having a heighth equal to the heighth of the flanges 16 and 17 of the inner channel 15. The width of the strand 23 is such that in the straight rest position of the conduit the flanges 16 and 17 of the inner channel 15 are held apart so that they are spaced a substantial distance from the flanges 20 and 21 of the outer channel 19. The spacer 23 is adhered or bonded to the adjoining flanges 16 and 17 of the inner channel 15 but is freely movable with respect to the base 22 of the outer channel 19.

Spacer cords 24 and 25 of paper, cotton or plastic are wrapped helically between the forward flange 20 of the outer channel 19 and the rearward flange 17 of the inner channel 15 and between the forward flange 16 of the inner channel 15 and the rearward flange 21 of the outer channel 19. The cord prevents the channels from touching each other during the covering extrusion process. If they were not located as described the channels would extend during the extrusion process and result in a conduit of poor flexibility.

Surrounding all of the foregoing elements is an outer circumferentially complete jacket 26 of such plastic material as fire retardant polyvinyl chloride. It is extruded in place to provide a water-tight impermeable sheath for protecting the interior of the conduit. It also provides an excellent abrasion barrier.

When a conduit such as that described in relation to FIG. 2 is in straight rest position its geometrical centerline is neither longer nor shorter than any other longitudinal axis extending parallel to that centerline. FIG. 5 however illustrates the condition of the conduit when it is subjected to a bend. The spacer strand 23 is compressed to a thinner width on the inside of the bend because the turns of the inner channel 15 come together. In doing so the edges of the flanges 16 and 17 slide together along the inside surface of the base 22 of the outer channel 19. By this action the space occupied by the cords 24 and 25 becomes greater, which is to say the distance increases between the flanges 20 and 17 and between the flanges 16 and 21. At the same time on the outside of the bend as shown in the upper portion of FIG. 5 the strand 23 is stretched between the flanges 16 and 17 because it is adhered to them. As a consequence within reasonable bending limits as shown in FIG. 5 the geometrical centerline of the conduit remains the one axis which does not change length, all other axes to the outside of it becoming longer and other axes to the inside of it becoming shorter. One advantage of this is that electrical wires extending through the conduit do not experience binding or undue tensioning. This action is commonly described as the neutral bending axis remaining coincident with the centerline.

Among the advantages of the construction provided by the invention are that the bore of the conduit is smooth and continuous, the spacer strand provides an effective internal seal and readily receives the threaded metal insert 11 of the end fitting as shown in FIG. 1. The two channel design provides versatility in metal selection and allows for optimum electrical grounding properties.

Turning now to FIG. 3, another form of the conduit of the invention is shown which includes an inner channel 15A having a forward flange 16A, a rearward flange 17A and a base 18A as in the previous embodiment. It also includes an outer channel 19A having a forward flange 20A and a rearward flange 21A, but in this form the flanges 20A and 21A are slightly deeper than the flanges 16A and 17A of the inner channel 15A. Consequently there is a space between the outer edges of the flanges 16A and 17A and the base 22A of the outer channel 19A.

The conduit of the FIG. 3 form also includes a spacer strand 23A but it does not include spacer cords such as the cords 24 and 25 of the FIG. 2 embodiment. Neither is it necessary that the spacer strand 23A be adhered to the flanges 16A and 17A of the inner channel 15A. Instead the spacer strand 23A has opposed edge portions 28 and 29 extending oppositely inside the base 22A of the outer channel 19A and around and over each of the forward and rearward flanges 16A and 17A of the inner channel 15A as shown. This fixes the spacer strand 23A in relation to the turns of the inner channel 15A and allows it to be stretched and compressed during bending as described in connection with the previous embodiment, while at the same time allowing it to move with respect to the outer channel 19A. The edge portions 28 and 29 also prevent the assembly from extending during the extrusion of an outer jacket 26A.

Figure 4:
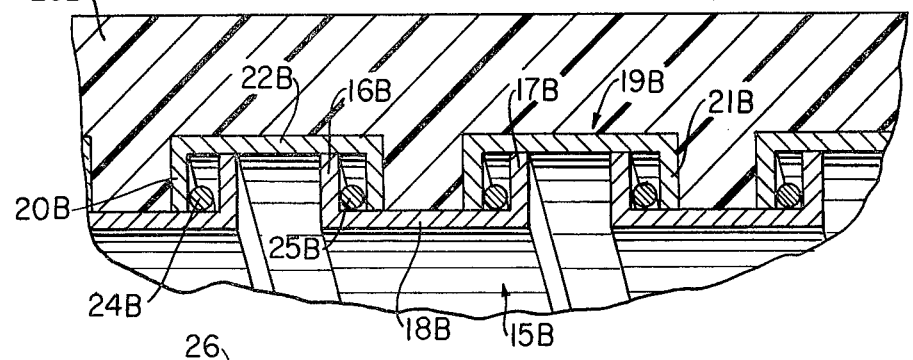
FIG. 4 is an enlarged fragmentary side view partly in section of still another embodiment of the conduit of the invention.

A third embodiment is shown in FIG. 4 which can be utilized where a smooth bore and an internal water seal are of no importance. The FIG. 4 form of the invention is identical to that of FIG. 2 except that it does not include a spacer strand 23. Therefore it comprises an inner channel 15B having forward and rearward flanges 16B and 17B joined by a base 18B, and an outer channel 19B having forward and rearward flanges 20B and 21B joined by a base 22B. As in FIG. 2 the shape and dimensions of the channels 15B and 19B are identical. Cords 24B and 25B are applied as previously and the entire assembly is surrounded by an outer jacket 26B. The conduit of FIG. 4 flexes in a manner similar to that of FIG. 2, which is to say the turns of the channels come together on the inside of a bend and separate on the outside of a bend with the neutral bending axis remaining coincident with the centerline of the structure. Because a spacer strand is considered to be dispensable in installations where the FIG. 4 conduit is used, it offers some advantage due to lighter weight and lower cost.

Referring again to FIG. 1, the insert 11 of the end fitting includes a helical land 30 which is screwed into the end portion of the conduit 10 to compress the spacer strand 23 as shown to hold the conduit in place. A turned back portion 31 of the insert is squeezed by the nut 12 to assist in their compression of the spacer strand 23. The strand 23A of the FIG. 3 conduit would be similarly compressed by the land 30 of the end fitting insert, and if the FIG. 1 end fitting is employed with the FIG. 4 conduit the land 30 simply fits into the space between the forward flange 17B and the rearward flange 16B of the inner channel 15B.

What is claimed is:

1. An electrical conduit comprising
   (a) an inner channel and an outer channel each having forward and rearward side flanges joined by a connecting base and wherein the flanges of the outer channel are longer than the flanges of the inner channel,
   (b) the inner channel being formed into helical configuration of spaced convolutions with its flanges extending outwardly,
   (c) the outer channel being formed into a similar helical configuration with its flanges extending inwardly,
   (d) the helical inner and outer channels being movably interlocked with the flanges of the outer channel disposed between the flanges of the inner channel,
   (e) elastic spacer means between the forward and rearward flanges of the inner channel for holding the turns of the inner channel apart,
   (f) the elastic spacer means having opposed edge portions extending inside the base of the outer channel and around and over each of the forward and rearward flanges of the inner channel for holding the forward flange of the outer channel a minimum distance from the rearward flange of the inner channel and for holding the forward flange of the inner channel a minimum distance from the rearward flange of the outer channel, and
   (g) an outer circumferentially complete jacket,
   (h) whereby when the conduit is bent the channel convolutions separate on the outside of the bend and come together on the inside of the bend.

2. An electrical conduit according to claim 1 wherein the elastic spacer means is a spacer strand having a squared-off body and together with the base of the inner channel forming a smooth conduit bore, the forward and rearward edges of the inner channel being held in fixed relation to the spacer strand so that the spacer strand is compressed on the inside of a conduit bend and stretched on the outside of a conduit bend.

3. An electrical conduit according to claim 2 wherein the spacer strand is adhered to the adjacent forward and rearward flanges of the inner channel.

* * * * *